May 11, 1943.                L. J. PETERS                2,318,795
                      SEISMOGRAPH AMPLIFIER SYSTEM
                         Filed Feb. 18, 1936        4 Sheets-Sheet 1
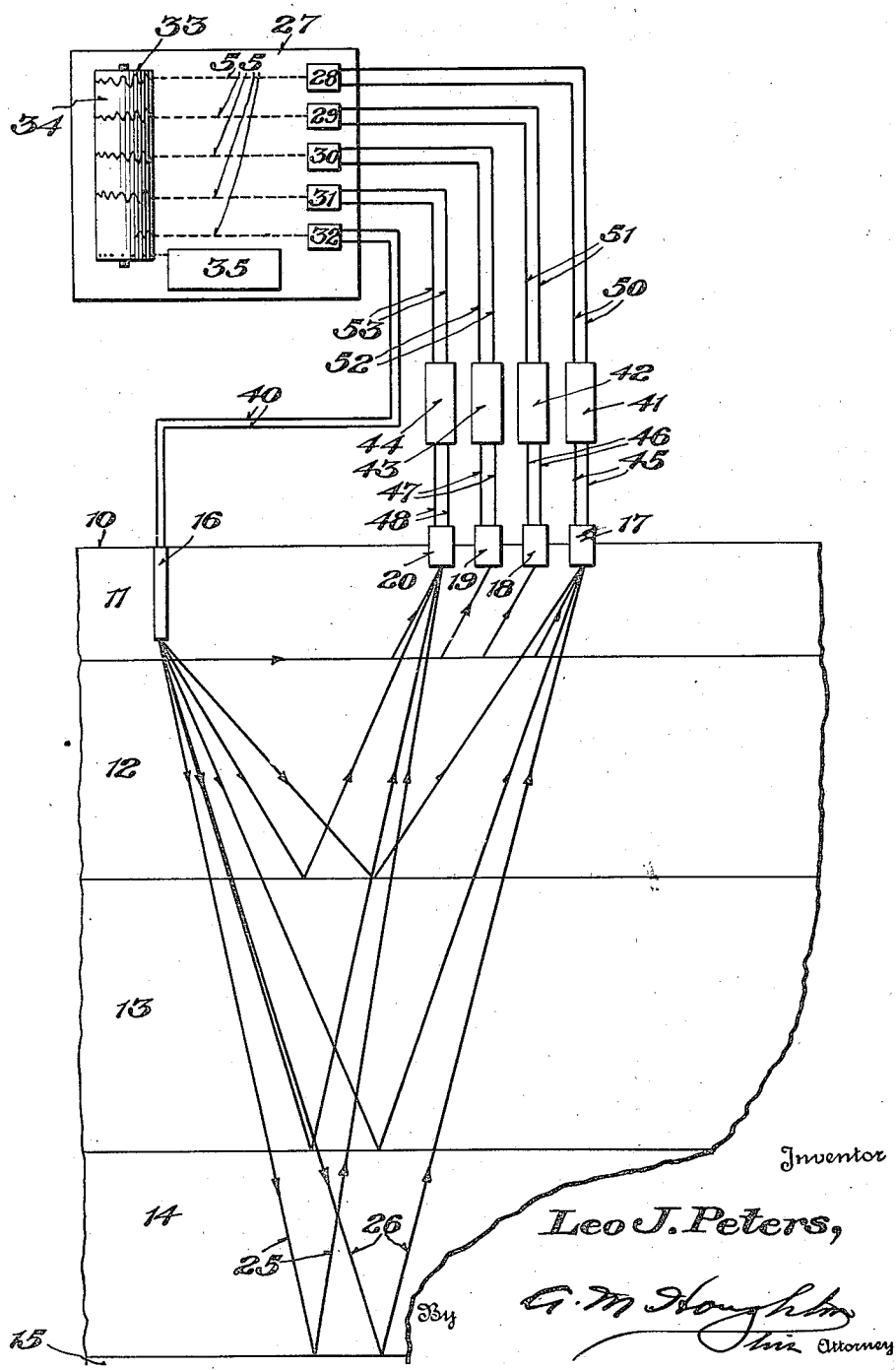
Inventor
Leo J. Peters, May 11, 1943. L. J. PETERS 2,318,795
SEISMOGRAPH AMPLIFIER SYSTEM
Filed Feb. 18, 1936 4 Sheets-Sheet 2

Inventor
Leo J. Peters,
By A. M. Houghton
his Attorney

May 11, 1943.　　　　L. J. PETERS　　　　2,318,795
SEISMOGRAPH AMPLIFIER SYSTEM
Filed Feb. 18, 1936　　　4 Sheets-Sheet 3
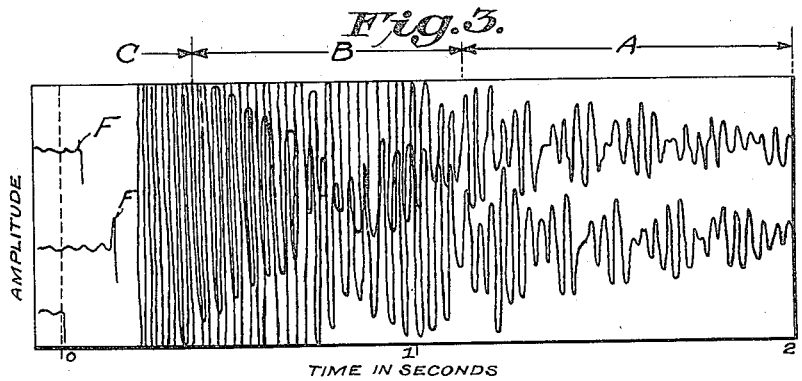
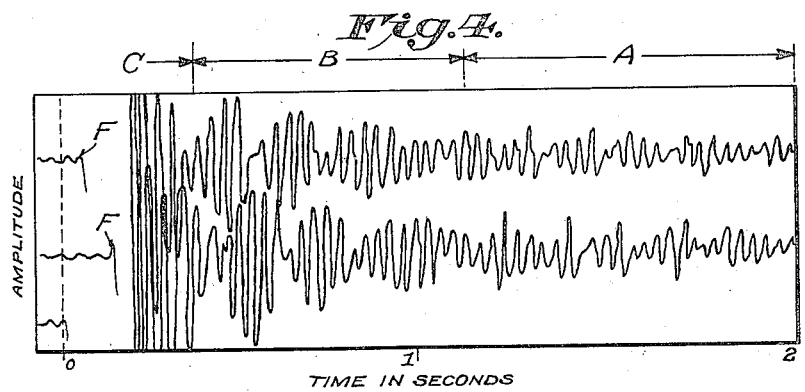
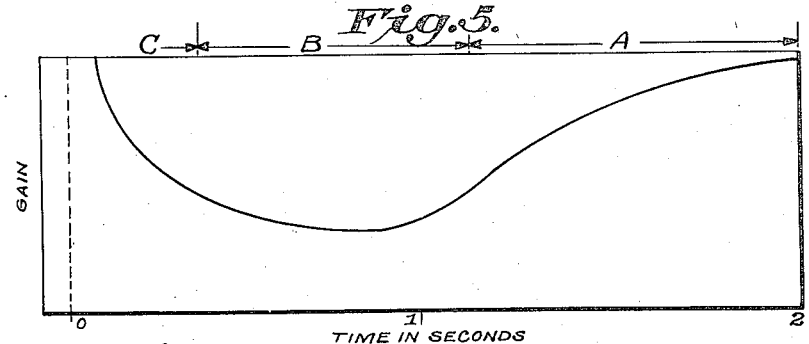
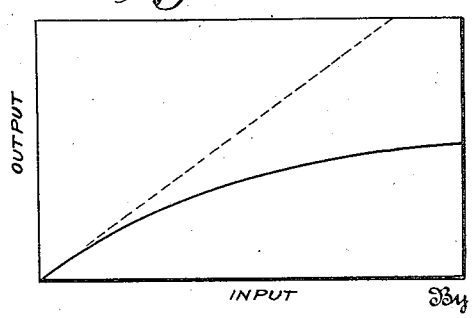
Inventor
Leo J. Peters, May 11, 1943.  L. J. PETERS  2,318,795

SEISMOGRAPH AMPLIFIER SYSTEM

Filed Feb. 18, 1936  4 Sheets-Sheet 4

Inventor
Leo J. Peters,
By
Attorney

Patented May 11, 1943

2,318,795

UNITED STATES PATENT OFFICE 2,318,795

SEISMOGRAPH AMPLIFIER SYSTEM

Leo J. Peters, Tulsa, Okla., assignor to Gulf Research & Development Company, Pittsburgh, Pa., a corporation of Delaware Application February 18, 1936, Serial No. 64,597

12 Claims. (Cl. 177—352)

This invention relates to seismograph amplifier systems; and it comprises, in a seismograph system having a seismic detector for receiving earth tremors of varying strength and producing a signal of correspondingly varying strength, and a recorder, the improvement comprising amplifying means adapted to transmit signals from the seismic detector to the recorder and to amplify such signals to an extent increasing as the signal strength decreases so that strong signals, which ordinarily reach the detector first, are transmitted to the recorder with little amplification and weak signals, ordinarily those coming later, are transmitted to the recorder with greater amplification; all as more fully hereinafter set forth and as claimed.

Modern seismographic prospecting makes use of a source of seismic waves such as a shot of dynamite and a plurality of detectors spaced therefrom. The detectors are of a type adapted to give an electrical signal proportional to the amplitude of earth tremors received at the detectors. The detector signals are amplified by a suitable amplifier and are transmitted to oscillograph elements in a recorder, in such manner that varying signals from the detector are reproduced as a wavy line on a moving piece of photographic paper. Means are provided for impressing timing marks on the paper so that the arrival time for any of the oscillations can be read. In operation, a shot is set off and in so doing impresses a zero timing mark on the paper. After a small interval of time the detectors begin to receive waves, which are seismic waves which have traveled from the shot down through the earth and have been refracted and reflected from strata interfaces back up to the detectors. Ordinarily a single shot gives rise to a prolonged oscillation of the earth, which gradually dies out. The oscillation is reflected in the record as a wavy line in which the waves gradually become of less magnitude and finally substantially die out.

It is almost always found that the first waves received are much stronger than succeeding waves. They are the waves which have passed through the shallower strata and have not lost so much of their energy as waves which go to deep strata before reaching the detectors.

Often the magnitude of the signal for the strong waves is so much greater than that for the weak waves that some difficulty is experienced in recording all the waves in a single operation. If the amplification is made sufficient to show up the weak tremors clearly, then the strong tremors produce extreme movement of the oscillograph element and an obscure record. On the other hand, if the amplification is adjusted so that the record for the strong waves is included within reasonable limits, then the record for the weak waves does not show up clearly.

More specifically, in reflection seismograph surveys it is often desired to record reflections from several layers lying at various depths below the surface of the earth. For example, in oil prospecting in northern Oklahoma it is desirable to map both the Pennsylvanian and Ordovician horizons. Because of the difficulties in recording described, in the past it has been found necessary to make a number of shots at each reflection set-up, either changing the sensitivity or amplification of the recording apparatus between operation, or else using different strengths of dynamite charges, or employing both expedients, so as to get a clear record for the different waves.

The present invention is well adapted for use in both refraction and reflection methods. For the sake of simplicity it will be described in connection with reflection shooting.

One object of the present invention is the provision of a detecting, amplifying and recording apparatus which gives a clear record for all magnitudes of waves coming to the detectors.

Another object is the provision, in a seismograph system having a detector and a recorder, of improved amplifying means incorporating means for automatically controlling the amplitude of signals transmitted to the recorder, so as to secure a more uniform record.

Another object is to provide such a system in which the automatic relation between input and output energy is adjustable.

Another object is to provide such a system including means for adjusting the time relation or lag of the automatic amplitude controlling relation; that is, the time required for the system to adjust itself to changes in input energy.

Another object is to provide, in seismograph amplifier and recorder circuits, means for causing the sensitivity of the amplifier-recorder circuit to vary as a function of energy picked up by the seismic detector over a predetermined time interval, usually a fraction of a second.

These and other objects are achieved by providing a seismograph system comprising a seismic detector of any one of the usual electrical types and a conventional recorder, and amplifying means transmitting signals from the detector to the recorder, the amplifying means comprising a pre-amplifier tube and an amplifier tube, variable shunting means across the output of the pre-amplifier tube, and means for diverting signal energy from some point in the circuit and causing it to vary the shunting effect of the shunting means in such manner that increase in signal energy increases the shunting effect and hence decreases the amplification factor.

Examples of specific embodiments of the invention are illustrated, more or less diagrammatically, in the accompanying diagrams and charts. In the showing:

Fig. 1 is a diagram illustrating the seismograph system of the invention applied to a typical reflection problem;

Fig. 2 is a diagram of the amplifier incorporating the amplitude control;

Figs. 3 and 4 are copies of seismograph records of the same set-up made by conventional apparatus and by use of the present invention, respectively;

Fig. 5 is a chart showing a typical gain-time relation obtained in the present system;

Fig. 6 is a chart showing a typical input-output relation obtained in the present system;

GENERAL COMBINATION

Figure 7:
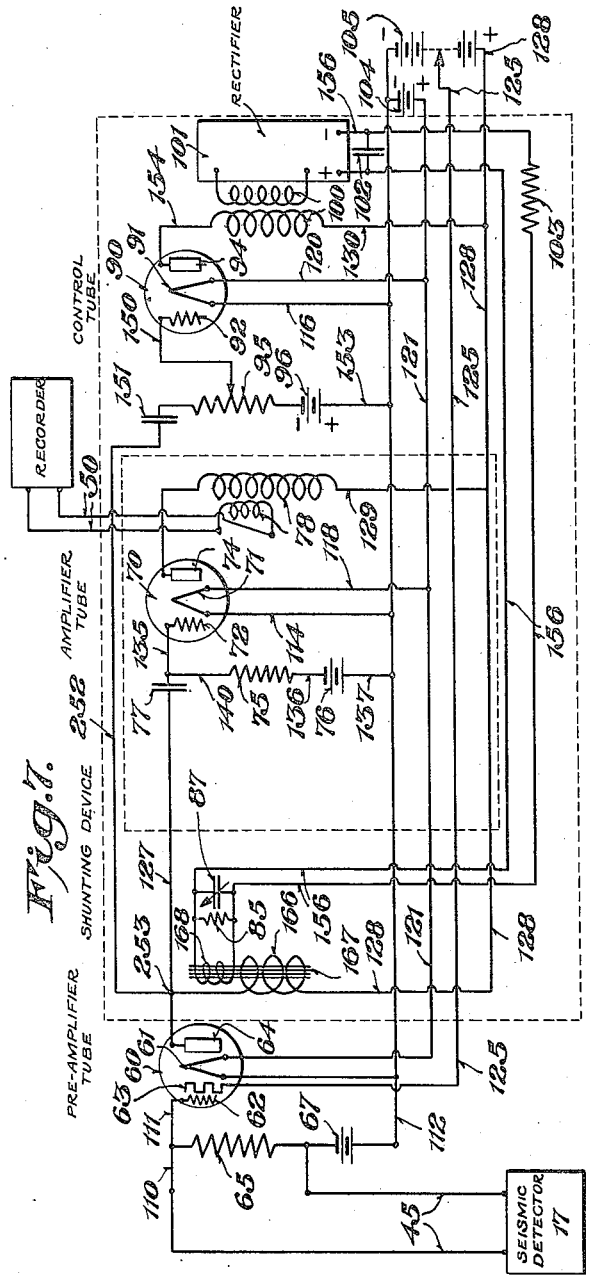
Fig. 7 is a diagram similar to Fig. 2 but showing a modified shunting means.

In the showings, in which like reference characters indicate like parts throughout, Fig. 1 shows a conventionalized geological terrain with a reflection set-up applied thereto. The surface of the earth is shown at 10. Underlying it are strata 11, 12, 13, 14 and 15, of earth, rock, etc. A source 16 of seismic waves such as an electrically fired charge of dynamite is set up, and a plurality of detectors, shown as four in number, are set up spaced from the source at 17, 18, 19 and 20. A portion of the wave energy passes along the shallow interface 11—12 between strata 11 and 12 and waves reach the detectors by broken paths as shown. These waves are ordinarily much stronger at the detector positions than those which penetrate deeper. Other portions of the wave energy reach the detectors as waves which have taken deep reflection paths, e. g., paths 25 and 26 representing reflection from deep strata interface 14—15.

A recorder 27 of known type is provided, comprising a plurality of oscillograph elements 28, 29, 30, 31 and 32, a rotating drum 33 carrying a strip of sensitized paper 34, and a timing device 35 adapted to impress timing marks on the paper in a known way. Oscillograph element 32 is connected to the source of waves by wires 40 in a known manner so that the firing of the shot causes a zero reference mark to be impressed on the paper.

According to the invention, amplifiers are provided, one for each detector, having automatic amplitude control. These are indicated at 41, 42, 43 and 44, connected by wires 45, 46, 47 and 48 with detectors 17, 18, 19 and 20; and by wires 50, 51, 52 and 53 with oscillograph elements 28, 29, 30 and 31.

In operation, the drum is started and the shot is fired. Waves are received at the detectors over a protracted interval of time. The detector signals are amplified and transmitted in the oscillograph elements, which produce a record on moving paper 34, by means of focused light beams indicated by dashed lines 55 in Fig. 1. The automatic amplitude control amplifiers cause the signals from the detectors to be amplified to a degree increasing as the signal energy decreases, thus producing a uniform record in a manner described in detail post.

Amplifier system—Elements

Fig. 2 is a detailed diagram showing the amplifier with one specific form of amplitude control incorporated, the elements of the control circuit proper being set off by dashed lines in the showing. The elements of the pre-amplifier proper are a tetrode thermionic preamplifier tube 60 having a filament 61, grid 62, screen grid 63 and plate 64; and resistance 65, high inductance 66 and a grid biasing battery 67. Additional tubes can be interposed between the pre-amplifier tube and the seismic detector, in known ways. The elements of the amplifier proper are a triode amplifier tube 70 having filament 71, grid 72 and plate 74; and resistance 75, battery 76, condenser 77 and output transformer 78.

The elements of the volume control are a shunting tetrode tube 80 having filament 81, grid 82, screen grid 83 and plate 84, and a resistance 85, battery 86 and condenser 87; and a control triode tube 90 having filament 91, grid 92 and plate 94, and a potentiometer 95, a battery 96, a transformer 100, a rectifier 101, condensers 151 and 102 and a resistance 103.

Power is supplied to the circuits through a fixed "A" battery 104 and a variable tap "B" battery 105.

Amplifier system—Circuits

The circuits for the detector and amplifier tubes are as follows: One wire 45 from the seismic detector (17) leads through connecting wires 110 and 111 to the grid 62 of tube 60. The other wire 45 leads to the negative side of battery 67. The positive side of the battery is connected with a wire 112 which leads to the negative side of batteries 104 and 105. One side of each of the filaments 61 and 71 is connected to wire 112 through leads 113 and 114, respectively. The other side of the filaments is connected through wires 117 and 118 with a wire 121 leading to the positive side of battery 104. Thus battery 104 is adapted to energize the filaments. Resistance 65 is connected in shunt between grid 62 and battery 67, as shown. The screen grid 63 of tube 60 is connected through a wire 125 with the center tap 126 of battery 105. The plate 64 of tube 60 is connected through a wire 127 and condenser 77 with the grid 72 of amplifier tube 70. Inductance 66 is connected to plate 64 through a segment of wire 127, as shown, and leads through a wire 128 to the positive side of battery 105. One side of the input portion of transformer 78 is connected to plate 74 of amplifier tube 70 by a wire 130. The other side of the input end of this transformer is connected through a lead 129 with wire 128. The output side of transformer 78 delivers through wires 50 to the recorder, as shown (Figs. 1 and 2). Resistance 75 and battery 76 are connected in series by a wire 136 and are connected in shunt between wires 135 and 112 by leads 140 and 137.

The portion of circuit just described is in effect an ordinary pre-amplifier and amplifier circuit. Its operation is known and needs no explanation. Signals from the seismic detector are amplified and the amplified signal is delivered to the recorder to produce a record on the sensitized paper.

The circuits for the amplitude control are as follows: The plate 84 and screen grid 83 of shunting tube 80 are connected directly to wire 127, as shown. The filament 81 is fed from wires 112 and 121 through leads 115 and 119, as shown and is thus adapted to be energized by battery 104. Upon energization of the filament of tube 80 and application of a suitable positive potential to grid 82, a current path is opened between wires 127 and 112, which has some shunting effect on the output from the pre-amplifier tube. However, the grid 82 of the shunting tube is negatively biased by battery 86 so that the plate impedance is normally relatively high, so the shunting effect is small. Means are provided for automatically making the grid more positive as the signal strength increases and thus increasing the shunting effect to secure amplitude control. The means for varying the shunting effect are as follows:

The amplifier tube circuit delivers to transformer 78 an amplified oscillating or alternating current proportional to the oscillating signal from the seismic detector, which signal in turn reflects the earth vibrations (tremors). Control tube 90 takes energy from the input side of transformer 78, and amplifies it. As shown, the filament 91 of this tube is fed through wires 116 and 129 from wires 112 and 121 and is thus adapted to be energized by battery 104. The grid 92 is connected through a variable tap 150 with resistance 95 which is in series with blocking condenser 151 connected to transformer 78 by lead 152. The blocking condenser isolates grid 92 of tube 90. The resistance is connected to battery 96, as shown. Battery 96 is connected to wire 112 by a lead 153. The plate 94 of the control tube is connected to one side of the input end of transformer 100 by a wire 154. The other side of the input end of this transformer is connected to wire 128 by a lead 130. The output side of transformer 100 delivers an amplified oscillating current. This output is delivered to rectifier 101 through leads 155. The rectifier, which is advantageously of the dry copper oxide type, changes the oscillating output into pulsating direct current. This is delivered through leads 156, shunted by condenser 102 to the resistance capacity combination 85, 87. Resistance 103 is interposed in one of the leads 156, as shown. The function of capacity 102 and resistance 103 is to filter the output from the rectifier and produce a substantially continuous current. Thus changes in magnitude of current at transformer 78 are caused to produce changes in potential applied to grid 82 of the shunting tube.

*Operation*

The operation of the circuit is as follows: Signal energy from the seismic detector is picked up by the pre-amplifier tube and transmitted to the amplifier tube, the amplified signal being sent to the recorder through the agency of transformer 78. Signal energy is taken off in parallel with transformer 78 through wire 152, condenser 151, potentiometer 95 and wire 150 to the grid 92 of tube 90. The amplified output energy of tube 90 is taken from plate 94 through lead 154 and the input portion of transformer 100 through leads 130 and 128 to the positive side of battery 105. Rectified, filtered current is delivered to the grid 82 of the shunting tube through the circuit described. As stated, the grid 82 of the shunting tube is negatively biased by battery 86 to have a relatively high plate impedance so that in the absence of applied controlling voltage the shunting effect is small and but little energy is diverted. The controlling voltage is applied in a direction such as to make the grid more positive upon increase of voltage, thereby reducing the plate impedance and diverting a larger proportion of energy from the amplifier tube. This causes a reduction of the output delivered to the recorder.

The main adjustments are the setting of potentiometer 95 and of variable capacitance 87. The setting of the potentiometer determines the amount of gain or the net amplification factor, assuming steady conditions (non-fluctuating signal). The adjustment of capacitance 87 determines the time constant or lag of the control circuit. That is, the value of capacitance 87 determines the interval of time between a sudden increase in signal strength from the seismic detector, and development of shunting effect. It is purposely provided that shunting effect should not be instantaneous, for reasons explained post.

The usual adjustments in vacuum tube circuits, such as the adjustment of the filament voltage, etc., are familiar to those skilled in the art and are not described.

The selection of proper values for the various resistances, inductances and capacitances is likewise within the skill of those familiar with the art.

Resistances 85 and 103, capacitance 102 and the value of rectifier 101 are selected to secure a time constant of the right order of magnitude. These apparatus elements can be of the adjustable or the fixed type as desired.

Because of the lag, the amplification at any instant is not a direct function of the potentiometer setting; it is variable depending not only upon the potentiometer setting but also on the time constant, and the amount of input energy received over the last short interval of time. If time lag were not provided, the amplitude control would act instantaneously and the seismograph curve would be a wavy line alternating between a constant maximum amplitude and zero amplitude. That is to say, the envelope of the seismogram would be parallel straight lines. This is not desirable. The time lag results in a curved seismogram trace envelope of desirable character as described post.

Stated in other words, the function of the control means is to make the sensitivity of the circuit, insofar as its output to the recorder is concerned, at any given time $t$, a function of the energy picked up by the seismic detector over a time interval $\Delta t = t - t_0$; $t_0$ being the instant of time at which the first arrivals reach the seismic detector. If the time interval $\Delta t$ be too short, the seismograph record of wave arrivals will be vague and indefinite; if too long, the controlling effect will be small and the system will function similarly to an ordinary, uncontrolled circuit. In practice I have found that $\Delta t$ should be between 0.05 and 0.04 second, more or less. The value of $\Delta t$ is variable by adjusting variable capacity 87.

Figure 8:
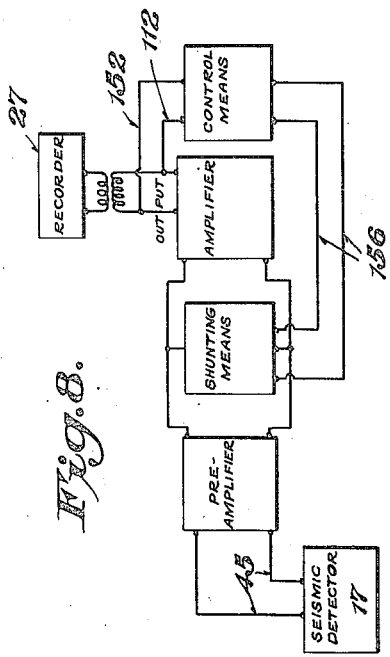
Fig. 8 is a simplified diagram based on Fig. 2 to show the general combination.

Fig. 8 is a simplified diagram to show the relation between the seismic detector, the elements of the amplifier circuit and the recorder.

Fig. 3 shows a portion of a typical seismogram record recording reception of waves at two detectors. There is a preliminary quiet period prior to firing the shot. The shot is fired at 0 second.

There is a short quiescent period after the shot is fired and then as at points F, sharp oscillations begin; oscillations corresponding to the waves received first. The oscillations continue of large magnitude for some time and gradually die down. The envelope of the oscillations is, in this typical case, roughly in the form of two lines widely separated from the axis at the beginning and gradually approaching the axis. Fig. 3 also illustrates a common difficulty in reflection work. The two records obscure each other in the first portions because of the great amplitude of the signals.

In applying amplitude control it is desired to have the waves indicated in approximately the region A of the diagram recorded full trength. Waves in approximately the region B should be recorded with reduced amplification. It is sometimes desirable that the first arrivals, in approximately the region C should be reproduced with large amplitude so that the time of first arrivals can be accurately determined. Thus it is seen that the requirements for amplitude control are not simple. It would not do to have a type of control which would make the envelope of the oscillations in the form of parallel lines.

Fig. 4 is a diagram similar to Fig. 3 but made with apparatu in which the present invention is incorporated. It is noted that the first arrivals are recorded full strength. So are the oscillations in region A. But those in region B are reduced in amplitude to a readable degree. The record in Fig. 4, which is a typical one obtained with the present invention, is in many respects ideal.

Fig. 5 is a chart showing the relation of gain or amplification factor to time in a system under the invention when the magnitude of the earth vibrations at the detectors varies with time in the manner described. It is noted that the gain is large at the beginning, in region C. It falls to a minimum value in region B and rises to a large value again in region A.

When the initial surge of energy from a seismic shot is received at the detector the amplification of the system is at its maximum and the amplitude of the recorded trace is not affected by the automatic control. As soon as sufficient energy has been received to charge condensers 87 and 102 the amplification is reduced and the amplitude of the trace on the record is reduced to a conveniently readable value. As the input energy decreases the amplification increases to its normal value as the charge on condensers 87 and 102 leaks off through resistance 85 and the rectifier.

In adjusting the electric circuit, the effects of change in the setting of potentiometer 95 and of condenser 87 are not independent. But roughly speaking, the effect of change of potentiometer 95 is to vary the ordinates of the curve in Fig. 5, while the effect of adjustment of condenser 87 is to vary the position of the minimum portion of the curve along the direction of abscissae. If the circuit were such that amplitude control was applied instantaneously, the envelope of the oscillations (Fig. 4) would be two lines parallel to the axis. The relation of gain to time would be an irregular curve corresponding in an inverse relation to the shape of the oscillations in Fig. 3. The introduction of lag provided as described ante produces a gain-time relation such as that shown in Fig. 5.

Fig. 6 shows the output-input relation in the circuit under steady conditions. The broken line shows the relation obtained in a linear amplifier. The relationship shown in Fig. 6, however, does not have much meaning in seismograph work because the signals fluctuate in strength; they are not steady.

The shunting means described in the specific embodiment is a vacuum tube circuit. This I regard as most advantageous in that the various adjustments can be easily made. However, instead of the vacuum tube circuit there can be employed a similar shunting device which in some cases presents advantages because of its simplicity and ruggedness. Such a device is a magnetic variable impedance arrangement. One example of this is shown in Fig. 7. The shunting tube is omitted and in its lieu is provided an inductance 166 connected to wire 127 and wire 128 similarly to coil 66 in Fig. 2. This inductance is provided with an iron core 167 and an additional coil 168. Coil 168 is connected directly to wires 156, condenser 87 being arranged in shunt. With this arrangement the amplified direct current from the control circuit causes variations in shunting effect across the detector tube output in a manner quite analogous to the action of the circuit of Fig. 2. Variation in time lag is adjusted by condenser 87 as before. In the circuit of Fig. 7, power for the amplitude control means is shown as being taken from a point in the circuit ahead of the amplifier tube; that is to say, grid 92 of control tube 90 is connected through variable resistance 95 and condenser 151, with the plate of the pre-amplifier tube, connection being made by means of a wire 252 and junction 253 as shown. This arrangement presents advantages in certain relations although the available energy is less since the signal has not yet been subjected to amplification (by the amplifier tube). Sometimes it is necessary to provide additional stages of amplification for the control when using this arrangement. Ordinarily I employ the arrangement shown in Fig. 2, condenser 151 being connected through wires 152 and 130 with the plate 74 of the amplifier tube and the input side of transformer 78.

What I claim is:

1. In a seismograph system comprising a seismic detector and an electric recorder, amplifying means receiving the output from the detector and delivering to the recorder, comprising a pre-amplifier tube, an amplifier tube in circuit therewith, means for variably shunting the output of the pre-amplifier tube and means taking signal energy from some point in the circuit and operably connected with the variable shunting means, to cause increase in shunting effect with increase in signal energy.

2. In a seismograph system comprising a seismic detector and an electrical recorder, amplifying means receiving the output from the detector and delivering to the recorder, comprising a pre-amplifier tube, an amplifying tube in circuit therewith, means for variably shunting the output of the pre-amplifier tube, and means taking energy from the amplifier output circuit and operably connected with the variable shunting means to cause increase in shunting effect across the pre-amplifier tube with increase in amplifier output.

3. In a seismograph system comprising a seismic detector and an electrical recorder, amplifying means receiving the output from the detector and delivering to the recorder, comprising a pre-amplifier tube, an amplifier tube in circuit therewith, a variable impedance device in shunt with the output of the pre-amplifier tube and means taking energy from the amplifier output circuit and operably connected with the variable impedance device so that increase in amplifier output causes increase in shunting effect.

4. In a seismograph system comprising a seismic detector and an electric recorder, amplifying means receiving the output from the detector and delivering to the recorder comprising a pre-amplifier tube, an amplifier tube in circuit therewith, a shunting tube with filament, grid and plate and connected in circuit with the pre-amplifier tube in such manner that varying plate impedance in the shunting tube causes varying shunting effect across the pre-amplifier tube output, and means taking energy from the amplifier output circuit and operably connected with the shunting tube so that increase in amplifier output causes decrease in plate impedance of the shunting tube and thus increase in shunting effect.

5. In a seismograph system comprising a seismic detector and an electric recorder, amplifying means receiving the output from the detector and delivering to the recorder, comprising a pre-amplifier tube, an amplifier tube in circuit therewith, a shunting tube with filament, grid and plate and connected in circuit with the pre-amplifier tube so that increase in grid-potential on the shunting tube shunts the pre-amplifier output, vacuum tube means taking energy from the amplifier output circuit and amplifying it as an oscillating current, a rectifier for changing the amplified current to direct current, and electrical connections for supplying the amplified direct current to the shunting tube so that increase in such direct current decreases the plate impedance of the shunting tube and hence increases the shunting effect of said tube.

6. In a seismograph system comprising a seismic detector and an electric recorder in a circuit, amplifying means between the seismic detector and the recorder comprising thermionic tubes in circuit and adapted to amplify all signals from the seismic detector, and means for varying the internal tube resistance of at least one tube in the amplifier in accordance with amplitude of waves received by the seismic detector.

7. An apparatus for recording, on a limited width of recorder strip, artificially produced seismic waves which include waves received from underlying strata of the earth, said waves comprising a series of waves diminishing in strength substantially as a function of time, comprising a seismic detector for converting the seismic waves into oscillating electrical signals, amplifying means for amplifying said signals, means adapted to record said amplified signals on said recorder strip, and means actuated by and responsive to signal energy for increasing the sensitivity of the apparatus as the strength of the waves received by the apparatus diminishes, as a function of said signal energy.

8. An apparatus for recording, on a limited width of recorder strip, artificially produced seismic waves which include waves received from underlying strata of the earth, said waves comprising a series of waves diminishing in relative energy substantially as a function of time, comprising a seismic detector for converting the seismic waves into oscillating electrical signals, amplifying means for amplifying said signals, means adapted to record said amplified signals on said recorder strip, and means actuated by and continuously responsive to signal energy for controlling the sensitivity of the amplifying means in such a way that it amplifies said signals with a sensitivity increasing as a function of the decreasing signal energy.

9. In combination, means for detecting a vibratory disturbance, means for amplifying the impulses from said detecting means for recording the amplified impulses, and means actuated by said first mentioned means for controlling the amplification ratio of said amplifier means at such a rate that all phases of the record are of usable amplitude.

10. In combination means for detecting a damped wave train in the earth, means for recording the impulses from said detector means, and means actuated by said first mentioned means for reducing the amplitude of the initial high amplitude vibrations of the wave train so that all phases of the record are of usable amplitude.

11. An apparatus for recording artificially produced seismic waves which include waves traveling from the source of the seismic detector through the surface layers of the earth and waves received from underlying strata of the earth, the surface waves being the first to arrive and comprising an initial weak vibration followed by very strong vibrations of progressively diminishing magnitude, and the waves received from underlying strata comprising a series of wave trains, said wave trains and the individual waves in each wave train diminishing in relative energy substantially as a function of time, comprising a seismic detector for converting the seismic waves into oscillating electrical signals, amplifying means for amplifying said signals, means adapted to record said amplified signals, and means for controlling the sensitivity of the amplifying means in such a way that it amplifies the electrical signal created by the initial vibration of the surface wave with maximum sensitivity and amplifies signals created by the successive wave trains from underlying strata with a sensitivity which is initially low but increases as the strength of said wave trains diminshes.

12. In a seismograph system comprising a seismic detector and an electric recorder in a circuit, amplifying means between the seismic detector and the recorder comprising thermionic tubes in circuit and adapted to amplify all signal energy from the seismic detector, and means for varying the internal tube resistance of at least one tube in the amplifier in accordance with amplitude of waves received by the seismic detector, said last named means including a condenser, means for charging the condenser with rectified signal energy, means for applying the condenser charge to the grid of one of said tubes to alter the internal resistance thereof, and means affording a leakage path across said condenser to discharge the same, the capacity of said condenser and the resistance offered by said leakage path being such that discharge of said condenser requires a substantial interval of time compared to the time interval during which seismic signal energy is received.

LEO J. PETERS.